United States Patent [19]

Horiuchi et al.

[11] Patent Number: 5,000,929
[45] Date of Patent: Mar. 19, 1991

[54] EXHAUST GAS PURIFICATION CATALYST

[75] Inventors: Makoto Horiuchi, Himeji; Yasuo Ikeda, Kawasaki; Koichi Saito, Himeji, all of Japan

[73] Assignee: Nippon Shokubai Kagaku Kogyo Co., Ltd., Osaka, Japan

[21] Appl. No.: 488,389

[22] Filed: Feb. 23, 1990

Related U.S. Application Data

[62] Division of Ser. No. 268,371, Nov. 7, 1988, abandoned.

[30] Foreign Application Priority Data

Nov. 7, 1987 [JP] Japan ................... 62-280299
Dec. 22, 1987 [JP] Japan ................... 62-322692
Dec. 24, 1987 [JP] Japan ................... 62-325583
Jul. 1, 1988 [JP] Japan ................... 63-162563

[51] Int. Cl.$^5$ ............................ B01D 53/36
[52] U.S. Cl. ................... 423/213.5; 423/215.5
[58] Field of Search ............ 502/302, 303, 304; 423/213.5, 215.5

[56] References Cited

U.S. PATENT DOCUMENTS

| | | | |
|---|---|---|---|
| 3,870,455 | 3/1975 | Hindin | 502/304 X |
| 3,993,572 | 11/1976 | Hindin et al. | 252/462 |
| 4,061,473 | 12/1977 | Norris | 44/51 |
| 4,363,753 | 12/1982 | Bozon et al. | 423/213.5 |
| 4,450,244 | 5/1984 | Domesle et al. | 502/185 |
| 4,451,441 | 5/1984 | Ernest et al. | 423/215.5 |
| 4,483,944 | 11/1984 | Day et al. | 502/439 |
| 4,504,598 | 3/1985 | Ono et al. | 502/303 |
| 4,528,279 | 7/1985 | Suzuki et al. | 502/200 |
| 4,617,289 | 10/1986 | Saito et al. | 423/215.5 |
| 4,749,671 | 6/1988 | Saito et al. | 502/64 |
| 4,791,091 | 12/1988 | Bricker et al. | 423/213.5 |
| 4,868,149 | 9/1989 | Bricker | 502/303 |

FOREIGN PATENT DOCUMENTS 197038 9/1986 Japan .................. 423/213.5

*Primary Examiner*—Jeffrey E. Russel
*Attorney, Agent, or Firm*—Sherman and Shalloway

[57] ABSTRACT

An exhaust gas purification catalyst for purifying carbonaceous fine particles comprising a refractory three-dimensional structure and deposited thereon, (a) a refractory inorganic oxide, (b) palladium and (c) an oxide of at least one element selected from the group consisting of praseodymium, neodymium and samarium as catalyst components.

8 Claims, No Drawings

EXHAUST GAS PURIFICATION CATALYST

This application is a division of application Ser. No. 07/268,371 filed Nov. 7, 1988, now abandoned.

This invention relates to a catalyst for purifying diesel engine exhaust gases and industrial exhaust gases containing combustible carbonaceous fine particles. More specifically, this invention relates to an exhaust gas purification catalyst having high durability, which gas a high ability to purify carbonaceous fine particles even when used under rigorous conditions, such as in a high-temperature oxidizing atmosphere.

In recent years, particulate substances in diesel engine exhaust gases (composed mainly of solid carbonaceous fine particles, sulfur-containing fine particles such as sulfate particles and liquid or solid high-molecular-weight hydrocarbon fine particles) have raised an environmental and hygienic problem. These fine particles are mostly less than 1 micron in size, and are prone to float in the air and to be inhaled upon respiration. Much consideration has therefore been given to this problem so as to set rigorous restrictions on the discharge of these fine particles from diesel engines.

A catalytic method has been studied as a method of removing these fine particles. According to this method, catalytic substances capable of burning carbonaceous fine particles are deposited on a refractory three-dimensional structure such as a ceramic foam, a wire mesh, a metal foam or a ceramic honeycomb structure so as to capture fine pariculate substances contained in diesel engine exhaust gases, etc., and carbonaceous fine particles are burnt under the discharge conditions (gas composition and temperature) of an exhaust gas obtained under normal running conditions of the diesel engine (or by using heating means such as an electric heater).

Generally, a catalyst having a high-temperature durability is desired as a catalyst for purification of diesel engine exhaust gases. Such a catalyst has the high ability to burn the carbonaceous fine particles, permits ignition at as low temperatures as possible, has the low ability to convert sulfur dioxide ($SO_2$) generated from a sulfur component contained in a large amount in light oil used as a fuel into sulfur trioxide ($SO_3$), and further is durable in a continuous operation under a high load.

However, no catalyst has been proposed which fully satisfies these requirements.

Various proposals have been made in order to increase the purification efficiency of carbonaceous fine particles.

In regard to the use of a platinum-group metal as a catalyst for burning carbonaceous fine particles Japanese Laid-Open Patent Publication No. 24597/1980 states to the effect that a rhodium (7.5%)-platinum alloy, a platinum/palladium (50/50) mixture, palladium deposited on tantalum oxide or cerium oxide, and an alloy composed of palladium and less than 75% by weight of platinum are effective on SOF (soluble organic fraction).

Japanese Laid-Open Patent Publications Nos. 29030/1986, 149222/1986, and 146314/1986 discloses that a catalyst composition comprising palladium and rhodium as main active components and an alkali metal, an alkaline earth metal, copper, lanthanum, zinc, manganese, etc. is effective.

A catalyst containing platinum as a catalyst component, however, is undesirable because it has a high ability to oxidize $SO_2$ in the exhaust gas, and a large amount of a sulfate ($SO_3$ or sulfuric acid mist resulting from oxidation of $SO_2$) forms and is accumulated. In contrast, palladium has a lower ratio of sulfate formation than platinum, the ability to burn carbonaceous fine particles, and heat resistance However, palladium has the defect that when it is exposed to an atomsphere containing exhaust gases of a diesel engine, its surface changes in oxidation state and rapidly loses activity. No palladium-containing catalyst has yet been proposed which is free from the above-mentioned defects.

It is an object of this invention to provide a practical exhaust gas purification catalyst for purifying carbonaceous fine particles which has an increased ability with selective oxidation and an increased exhaust gas purifying capability, can be maintained stably for a long period of time in a diesel engine exhaust gas, and also shows heat resistance and durability.

In order to achieve the above object, the present inventors extensively worked on the reaction behavior of palladium in a diesel engine exhaust gas, and have found that by the combination of palladium with an oxide of at least one rare earth element selected from praseodymium, neodymium and samarium, palladium can be stabilized, and there can be obtained a catalyst having heat resistance, durability and the high ability with selective oxidation, and maintaining properties for a long period of time in a diesel engine exhaust gas which has a temperature of more than 400° C.

According to this invention, there is provided an exhaust gas purification catalyst for purifying carbonaceous fine particles comprising a refractory three-dimensional structure and deposited thereon, (a) a refractory inorganic oxide, (b) palladium and (c) an oxide of at least one element selected from the group consisting of praseodymium, neodymium and samarium, as catalyst components.

Usually, the catalyst of this invention is of such a form that palladium and the oxide of at least one rare earth metal selected from praseodymium, neodymium and samarium are dispersed in and deposited on a refractory inorganic oxide deposited on a refractory three-dimensional structure.

Examples of the refractory inorganic oxide used in this invention include active alumina, silica, titania, zirconia, silica-alumina, alumina-zirconia, alumina-titania, silica-titania, silica-zirconia, titania-zirconia, and zeolites.

The starting material for palladium is selected, for example, from palladium nitrate, palladium chloride, palladium tetramine chloride and palladium sulfide complex salts.

Suitable starting materials for praseodymium, neodymium and samarium are commercial water- or organic solvent-soluble salts such as oxides, chlorides, nitrates and carbonates.

The amounts of the components constituting the catalyst layer are as follows:- The amount of the refractory inorganic oxide deposited is 3 to 300 g, preferably 10 to 200 g, per liter of the three-dimensional structure The total amount of the oxide of at least one element selected from praseodymium, neodymium and samarium is 1 to 50 g, preferably 3 to 30 g, per liter of the three-dimensional structure. The amount of palladium deposited is 0.1 to 20 g, preferably 1 to 10 g, per liter of the structure.

As required, an oxide of cerium and/or an oxide of lanthanum may be deposited in an amount of 0.3 to 40 g, preferably 1 to 30 g, per liter of the structure.

The method of preparing the catalyst of this invention is not limited The following methods may be cited as preferred methods.

(1) A powder of the refractory inorganic oxide is wet-pulverized to form a slurry, and the refractory three-dimensional structure is immersed in the slurry. The excess of the slurry is removed, and the three-dimensional structure is dried at 80° to 250° C., and then calcined at 300° to 850° C., preferably 400° to 800° C. to obtain a three-dimensional structure coated with the refractory inorganic oxide Then, this three-dimensional structure is immersed in an aqueous solution containing predetermined amounts of a palladium compound and a compound of at least one element selected from the group consisting of praseodymium, neodymium and samarium. The excess of the solution is removed. The three-dimensional structure was dried at 80° to 250° C., and then calcined 300° to 850° C., preferably 400° to 800° C. to form a finished catalyst.

(2) The refractory three-dimensional structure is immersed in slurry containing a compound of at least one element selected from the group consisting of praseodymium, seodymium and samarium and the refractory inorganic oxide. The excess of the slurry is removed. The three-dimensional structure is dried at 80° to 250° C., and then calcined at 300° to 800° C., preferably 300° to 800° C. to form a coat layer on the refractory three-dimensional structure. Then, the three-dimensional structure is immersed in an aqueous solution of a palladium salt, then dried at 80° to 250° C., and calcined at 300° to 850° C., preferably 400° to 800° C. to give a finished catalyst.

(3) The refractory inorganic oxide is immersed in an aqueous solution of a compound of at least one element selected from the group consisting of praseodymium, neodymium and samarium, dried at 80° to 250° C., and calcined at 300° to 850° C., preferably 400° to 800° C. to deposit the oxide of the element on the refractory inorganic oxide and fix it thereto. Then, the refractory inorganic oxide is wet-pulverized to form a slurry. The refractory three-dimensional structure is immersed in this slurry, and then the excess of the slurry is removed. The three-dimensional structure is dried at 80° to 250° C., and then calcined at 300° to 850° C., preferably 400° to 800° C. Then, palladium is deposited on, and fixed to, the three-dimensional structure as in method (2) above.

(4) The refractory three-dimensional structure is immersed in a slurry containing a compound of at least one element selected from the group consisting of praseodymium, seodymium and samarium, the refractory inorganic oxide, and a palladium compound. The excess of the slurry is then removed, and the three-dimensional structure is dried at 80° to 250° C., and then calcined at 300° to 850° C., preferably 400° to 800° C.

A ceramic foam, an open flow type ceramic honeycomb structure, a wall flow-type honeycomb monolithic structure, an open flow-type metal honeycomb structure, a metal foam, and a metal mesh may be used as the refractory three-dimensional structure. The wall flow-type honeycomb monolithic structure, an open flow-type ceramic honeycomb structure, and a ceramic foam are preferably used.

The exhaust gas purification catalyst of this invention comprising the refractory inorganic oxide, the oxide of at least one element selected from the group consisting of praseodymium, neodymium and samarium and palladium has the ability to burn carbonaceus fine particles from low temperatures, a low ratio of sulfate formation, and an excellent ability with selective oxidation. Furthermore, since the catalyst of this invention contains the oxide of at least one element selected from the group consisting of praseodymium neodymium and samarium, palladium can be stabilized and it exhibits its excellent purifying capability at low temperatures with good reproducibility. Furthermore, it has excellent eat resistance and durability, and maintains its initial-stage activity for a long period of time under the discharge conditions (gas composition and temperature) of an exhaust gas from a diesel engine.

The following Examples and Comparative Examples illustrate the present invention further. Needless to say, the present invention is not limited to these examples alone.

EXAMPLE 1

Two kilograms of alumina having a specific surface area of 130 $m^2/g$ were weighed, and wet-pulverized with water to form a slurry. A wall flow-type monolithic carrier of cordierite (a honeycomb three-dimensional structure of the type in which adjacent pores at both end surfaces were closed alternately and gases were allowed to pass only from partitioning walls), 5.66 inches in diameter and 6 00 inch in length, was immersed in the resulting slurry. The excess of the slurry was removed, and the carrier was dried at 150° C. for 3 hours and then calcined at 800° C. for 4 hours to obtain an alumina-deposited structure.

Then, 900 g of neodymium nitrate having a purity of 99.9% $Nd(NO_3)_3.6H_2O$] and palladium nitrate containing 11.5 g of palladium were dissolved in deionized water to obtain 1.5 liters of a solution. The alumina-deposited three-dimensional structure was immersed in the resulting solution. The excessive solution gas removed, and the three-dimensional structure was dried at 150° C. for 3 hours and then calcined at 500° C. for 2 hours to obtain a finished catalyst.

The amounts of alumina, palladium and neodymium oxide ($Nd_2O_3$) of the catalyst were 20 g, 1.0 g, and 30 g, respectively, per liter of the structure.

EXAMPLE 2

Two kilograms of active alumina having a specific surface area of 150 $m^2/g$ were weighed and wet-pulverized with water to form a slurry The same three-dimensional structure as used in Example 1 was immersed n the slurry The excessive slurry was removed and the structure was dried at 200° C. for 3 hours and then calcined at 500° C. for 2 hours to give an alumina-deposited structure.

Then, 307.7 g of samarium oxide ($Sm_2O_3$) having a purity of 99.9% and palladium nitrate containing 15.4 g of palladium were dissolved in a dilute aqueous solution of nitric acid to give 2 liters of a solution. The alumina-deposited three-dimensional structure was immersed in the resulting solution. The excess of the solution was removed, and the structure was dried at 150° C. for 6 hours, and then calcined at 600° C. for 2 hours to give a finished catalyst.

The amounts of alumina, palladium and samarium oxide deposited in the catalyst were 10 g, 1.0 g and 20 g, respectively, per liter of the three-dimensional structure.

EXAMPLE 3

In a dilute aqueous solution of nitric acid were dissolved 589 g of commercial praseodymium nitrate [$Pr(NO_3)_3.6H_2O$] and palladium nitrate containing 38 g of palladium to form 3 liters of a solution.

A three-dimensional structure having alumina deposited in an amount of 40 g per liter of the structure prepared as in Example 1 was immersed in the resulting solution. The excessive solution was removed, and the structure was dried at 150° C. for 3 hours, and calcined at 500° C. for 2 hours to give a finished catalyst.

The amounts of palladium and praseodymium oxide deposited in the catalyst were 1.7 g and 10 g, respectively, per liter of the structure.

EXAMPLE 4

A powdery mixture of 1 kg of active alumina having a specific surface area of 90 $m^2/g$ and 1 kg of zirconia having a specific surface of 80 2 $m^2/g$ was pulverized with water to form a slurry The same three-dimensional structure as used in Example 1 was immersed in the slurry The excess of the slurry was removed and the structure was dried at 150° C. for 3 hours, and calcined at 600° C. for 2 hours to give a structure having alumina-zirconia deposited thereon.

Then, 496 g of neodymium oxide having a purity of 93% (containing 2.3% of $Pr_6O_{11}$, 1.7% of $La_2O_3$ and 1.3% of $CeO_2$) and palladium nitrate containing 23 g of palladium were dissolved in a dilute aqueous solution of nitric acid to form 2 liters of a soluton. The three-dimensional structure having alumina-zirconia deposited thereon was immersed in the resulting solution. The excess of the solution was removed, and the structure as dried at 150° C. for 5 hours and then calcined at 700° C. for 2 hours to give a finished catalyst.

The amounts of alumina, zirconia, palladium and neodymium oxide deposited in the catalyst were 10 g, 10 g, 1.5 g and 30 g, respectively, per liter of the structure.

EXAMPLE 5

One kilograms of active alumina having a specific surface area of 150 $m^2/g$ was impregnated in a solution of 316 g of praseodymium oxide (further containing 1.8% of $Nd_2O_3$, 1.5% of La and 1.0% of $CeO_2$). The mixture was fully stirred, dried at 150° C. for 6 hours and then calcined at 500° C. for 2 hours to give an alumina powder having praseodymium oxide deposited thereon.

One kilogram of the powder was wet pulverized to form a slurry The same three-dimensional structure as used in Example 1 was immersed in the slurry. The excess of the slurry was removed, and the three-dimensional structure was dried at 150° C. for 3 hours, nd calcined at 500° C. for 2 hours to give a structure having deposited thereon alumina containing praseodymium oxide.

Palladium chloride containing 44 g of palladium was dissolved in deionized water to obtain 3 liters of a solution The above structure having deposited thereon alumina containing praseodymium oxide was immersed in the solution The excess of the solution was removed, and the structure was dried at 150° C. for 3 hours and then calcined at 700° C. for 2 hours to give finished catalyst.

The amount of alumina, palladium and praseodymium oxide deposited in the catalyst were 30 g, 1.9 g and 9 g, respectively, per liter of the structure.

EXAMPLE 6

Two kilograms of titania having a specific surface area of 72 $m^2/g$ were wet-pulverized with water, and the same three dimensional structure as used in Example 1 was immersed in the slurry. The excess of the slurry was removed, and the structure was dried at 150° C. for 3 hours and then calcined at 600° C. for 2 hours to give a structure having titania deposited thereon.

Then, 637 g of samarium nitrate [$Sm(NO_3)_3.6H_2O$] and palladium nitrate containing 37 g of palladium were dissolved in deionized water to give 2 liters of a solution. The above titania-deposited three-dimensional structure was immersed in the solution The excess of the solution was removed, and the structure was dried at 120° C. for 3 hours, and then calcined at 500° C. for 1 hour to give a finished catalyst.

The amounts of titania, palladium and samarium oxide deposited in the resulting catalyst were 15 g, 2.2 g and 15 g, respectively, per liter of the structure.

EXAMPLE 7

Two kilograms of an alumina-silica complex oxide having a specific surface area of 135 m2 ($Al_2O_3/SiO_2$ mole ratio=4/1) were weighed and wet-pulverized with water to form a slurry. The same three-dimensional structure as used in Example 1 was immersed in the slurry. The excess of the slurry was removed. The structure was dried at 150° C. for 3 hours and then calcined at 500° C. for 2 hours to give an alumina-silica deposited structure.

Then, as in Example 1, palladium and neodymium oxide were deposited on the resulting structure to give a finished catalyst.

The amounts of alumina-silica, palladium and neodymium oxide deposited in the catalyst were 20 g, 1.0 g and 30 g, respectively, per liter of the structure.

EXAMPLE 8

One kilogram of alumina having a specific surface area of 130 $m^2/g$ was impregnated with a solution of 725 g of praseodymium nitrate having a purity of 99.9% and palladium nitrate containing 150 g of palladium in deionized water. After thorough stirring, the mixture was dried at 150° C. for 6 hours and then calcined at 700° C. for 2 hours to give an aluminum powder containing praseodymium oxide and palladium. One kilogram of the powder was wet-pulverized to form a slurry. The same three-dimensional structure as used in Example 1 was immersed in the slurry. The excess of the slurry was removed, and the structure was dried at 150° C. for 3 hours and then calcined at 400° C. for 2 hours to give a finished catalyst.

The amounts of alumina, palladium and praseodymium oxide deposited in the resulting catalyst were 0 g, 6 g and 11 g, respectively, per liter of the structure.

EXAMPLE 9

Two kilogram of a zirconia powder having a specific surface area of 130 $m^2/g$ were weighed and wet-pulverized with water to form a slurry. The same three-dimensional structure as used in Example 1 was immersed in the slurry. The excess of the slurry was removed, and the structure was dried at 150° C. for 3 hours and then calcined at 500° C. for 2 hours to give a zirconia-deposited structure.

Then, 608 g of praseodymium nitrate Pr(NO$_3$)$_3$.6-H$_2$O] and palladium nitrate containing 23 g of palladium were dissolved in deionized water to give 2 liters of a solution The zirconia-deposited three-dimensional structure was immersed in the solution. The excess of the solution was removed, and the structure was dried at 150° C. for 3 hours and then calcined at 500 C for 2 hours to give a finished catalyst.

The amounts of zirconia, palladium and praseodymium oxide (Pr$_6$O$_{11}$) deposited in the resulting catalyst were 60 g, 1.5 g and 1.5 g, respectively, per liter of the structure.

EXAMPLE 10

One kilogram of a zirconia powder having a specific surface area of 46 m2/g was weighed and wet-pulverized with water to form 2.5 kg of a slurry containing 40% by weight of zirconia. Five hundred grams of commercial alumina sol containing 20% by weight of alumina was put in the slurry to obtain a zirconia slurry containing soluble alumina.

The same three-dimensional structure as used in Example 1 was immersed in the slurry, and the excess of the slurry was removed. The structure was dried at 150° C. for 3 hours and then calcined at 400° C. for 2 hours to give a zirconia-deposited structure.

Then, 408 g of lanthanum nitrate, 280 g of neodymium nitrate and palladium nitrate containing 65 g of palladium were dissolved in deionized water to give 2 liters of a solution. The zirconia-deposited three-dimensional structure was immersed in the solution. The excess of the solution was removed, and the structure was dried at 150° C. for 3 hours and then calcined at 500° C. for 2 hours.

The amounts of zirconia, alumina, palladium, lanthanum oxide and neodymium oxide deposited in the resulting catalyst were 80 g, 8 g, 4.2 g, 10 g and 7 g, respectively, per liter of the structure.

EXAMPLE 11

One kilogram of a zirconia powder having a specific surface area of 2 m$^2$/g and an average particle diameter of 30 micrometers was put in 1 kg of commercial silica sol containing 20% by weight of silica. They were fully mixed to form a slurry. The same three-dimensional structure as used in Example 1 was immersed in the resulting slurry. The excess of the slurry was removed, and the structure was dried at 150° C. for 3 hours and then calcined at 500° C. for 2 hours to give a zirconia-deposited structure.

Then, 292 g of praseodymium nitrate, 232 g of cerium nitrate, 141 g of samarium nitrate and palladium nitrate containing 35 g of palladium were dissolved in deionized water to give 2 liters of a solution. The zirconia-deposited structure was immersed in the solution. The excess of the solution was removed, and the structure was dried at 150° C. for 3 hours and then calcined at 500° C. for 2 hours to give a finished catalyst.

The amounts of zirconia, silica, palladium, praseodymium oxide, cerium oxide and samarium oxide deposited in the resulting catalyst were 50 g, 10 g, 1.9 g, 6 g, 5 g and 3 g, respectively, per liter of the structure.

EXAMPLE 12

304 g praseodymium nitrate, 421 g of neodymium nitrate, 235 g of samarium nitrate and palladium nitrate containing 35 g of palladium were dissolved in deionized water to obtain 3 liters of a solution. An alumina-deposited structure prepared as in Example 3 was immersed in the resulting solution. The excess of the solution was removed, and the structure was dried at 150° C. for 3 hours and then calcined at 800° C. for 2 hours to give a finished catalyst.

The amounts of alumina, palladium, praseodymium oxide, neodymium oxide and samarium oxide deposited in the catalyst were 40 g, 1.5 g, 5 g, 7 g and 4 g, respectively, per liter of the structure.

EXAMPLE 13

A finished catalyst was prepared in the same way as in Example 3 except that a cordierite foam (ceramic foam: bulk density 0.35 g/cm$^2$; porosity 87.5%; volume 2.5 liters) was used instead of the wall flow-type honeycomb monolithic structure.

The amounts of alumina, palladium and praseodymium oxide deposited in the catalyst were 40 g, 1.7 g and 10 g, respectively, per liter of the structure.

EXAMPLE 14

Two kilograms of alumina having a specific surface area of 150 m$^2$/g were weighed and wet-pulverized with water to form a slurry. A cylindrical cordierite monolithic carrier having a diameter of 5.66 inches and a length of 6.00 inches and containing 400 open flow gas flow cells with a cross sectional surface area of 1 inch$^2$ was immersed in the slurry. The excess of the slurry was removed, and the carrier was dried at 150° C. for 3 hours and then calcined at 400° C. for 2 hours to obtain an alumina-deposited structure.

Then, 711 g of neodymium nitrate and palladium nitrate containing 21.8 g of palladium were dissolved in deionized water to give 3 liters of a solution. The alumina-deposited three-dimensional structure was immersed in the resulting solution The excess of the solution was removed, and the structure was dried at 150° C. for 3 hours and then calcined at 500° C. for 2 hours to give a finished catalyst.

The amounts of alumina, palladium and neodymium oxide deposited in the catalyst were 80 g, 0.8 g and 10 g, respectively, per liter of the structure.

EXAMPLE 15

Praseodymium nitrate (220 g) and palladium nitrate containing 41.7 g of palladium were dissolved in deionized water to form 2 liters of a solution. Two kilograms of alumina having a specific surface area of 100 m$^2$/g was impregnated with the solution. After thorough stirring, the mixture was dried at 150° C. for 6 hours and then calcined at 500° C. for 2 hours to give an alumina powder containing praseodymium oxide and palladium. Two kilograms of this powder was wet-pulverized with water to form a slurry. The same three-dimensional structure as used in Example 14 was immersed in the slurry. The excess of the slurry was removed, and the structure was dried at 150° C. for 2 hours to give a finished catalyst.

The amounts of alumina, palladium and praseodymium oxide deposited in the catalyst were 145 g, 3 g and 6 g, respectively, per liter of the structure.

COMPARATIVE EXAMPLE 1

An alumina-deposited three-dimensional structure prepared as in Example 3 was immersed in 2 liters of an aqueous solution of palladium nitrate containing 38 g of palladium The excess of the solution was removed, and the structure was dried at 150° C. for 3 hours, and then calcined at 500° C. for 2 hours to give a finished catalyst.

The amounts of alumina and palladium deposited in the catalyst were 40 g and 1.7 g, respectively, per liter of the structure.

COMPARATIVE EXAMPLE 2

Example 3 was repeated except that 613 g of lanthanum nitride [La(NO$_3$)$_3$.6H$_2$O] having a purity of 9.9% was used instead of praseodymium nitrate.

The amounts of alumina, palladium and lanthanum oxide deposited in the finished catalyst were 40 g, 1.70 g and 10 g, respectively, per liter of the structure.

COMPARATIVE EXAMPLE 3

In deionized water were dissolved 873 g of cerium nitrate [Ce(NO$_3$)$_3$.6H$_2$O] and palladium nitrate containing 11.5 g of palladium to form 1.5 liters of a solution. A three-dimensional structure having deposited thereon 20 g, per liter of the structure, of alumina, which was prepared as in Example 1, was immersed in this solution. The excess of the solution was removed, and the structure was dried at 150° C. for 3 hours and then calcined at 500° C. for 2 hours to give a finished catalyst.

The amounts o( palladium and cerium oxide deposited in the catalyst were 1.0 q and 30 g, respectively, per liter of the catalyst

COMPARATIVE EXAMPLE 4

Palladium nitrate containing 23 g of palladium was dissolved in deionized water to form 2 liters of a solution. A zirconia-deposited three-dimensional structure prepared as in Example 9 was immersed in the solution. The excess of the solution was removed, and the structure was dried at 150° C. for 3 hours and calcined at 500° C. for 2 hours to give a finished catalyst.

The amounts of zirconia and palladium deposited in the resulting catalyst were 60 g and 1.5 g, respectively, per liter of the structure.

COMPARATIVE EXAMPLE 5

Palladium nitrate containing 21.8 g of palladium was dissolved in deionized water to form 3 liters of an aqueous solution An alumina-deposited three-dimensional structure prepared as in Example 14 was immersed in the solution. The excess of the solution was removed, and the structure was dried at 150° C. for 3 hours and then calcined at 500° C. for 3 hours to give a finished catalyst. The amounts of alumina and palladium deposited in the resulting catalyst were 80 g and 0.8 g, respectively, per liter of the structure.

The amounts of the catalyst components (the refractory inoganic oxide, palladium and additional components) deposited in the catalysts obtained in Examples 1 to 15 and Comparative Examples 1 to 5 per liter of the three-dimensional strucure (carrier) are shown in Table 1.

TABLE 1

| | Refractory inorganic oxide (g/l-carrier) | | Palladium (g/l-carrier) | Additional components (g/l-carrier) | | Three-dimensional structure (type) |
|---|---|---|---|---|---|---|
| Example | | | | | | |
| 1 | Al$_2$O$_3$ | 20 | 1.0 | Nd$_2$O$_3$ | 30 | Wall flow-type |
| 2 | Al$_2$O$_3$ | 10 | 1.0 | Sm$_2$O$_3$ | 20 | " |
| 3 | Al$_2$O$_3$ | 40 | 1.7 | Pr$_6$O$_{11}$ | 10 | " |
| 4 | Al$_2$O$_3$ | 10 | 1.5 | Nd$_2$O$_3$ | 30 | " |
|   | ZrO$_2$ | 10 | | | | |
| 5 | Al$_2$O$_3$ | 30 | 1.9 | Pr$_6$O$_{11}$ | 9 | " |
| 6 | TiO$_2$ | 15 | 2.2 | Sm$_2$O$_3$ | 15 | " |
| 7 | Al$_2$O$_3$/SiO$_2$ (4/1) | 20 | 1.0 | Nd$_2$O$_3$ | 30 | " |
| 8 | Al$_2$O$_3$ | 40 | 6.0 | Pr$_6$O$_{11}$ | 11 | " |
| 9 | ZrO$_2$ | 60 | 1.5 | Pr$_6$O$_{11}$ | 15 | " |
| 10 | ZrO$_2$ | 80 | 4.2 | La$_2$O$_3$ | 10 | " |
|    | Al$_2$O$_3$ | 8 | | Nd$_2$O$_3$ | 7 | " |
| 11 | ZrO$_2$ | 50 | 1.9 | Pr$_6$O$_{11}$ | 6 | " |
|    | SiO$_2$ | 10 | | CeO$_2$ | 5 | |
|    | | | | Sm$_2$O$_3$ | 3 | |
| 12 | Al$_2$O$_3$ | 40 | 1.5 | Pr$_6$O$_{11}$ | 5 | " |
|    | | | | Nd$_2$O$_3$ | 7 | " |
|    | | | | Sm$_2$O$_3$ | 4 | " |
| 13 | Al$_2$O$_3$ | 40 | 1.7 | Pr$_6$O$_{11}$ | 10 | Ceramic foam |
| 14 | Al$_2$O$_3$ | 80 | 0.8 | Nd$_2$O$_3$ | 10 | Ceramic honeycomb |
| 15 | Al$_2$O$_3$ | 145 | 3 | Pr$_6$O$_{11}$ | 6 | " |
| Comparative Example | | | | | | |
| 1 | Al$_2$O$_3$ | 40 | 1.7 | — | | Wall flow-type |
| 2 | Al$_2$O$_3$ | 40 | 1.7 | La$_2$O$_3$ | 10 | " |
| 3 | Al$_2$O$_3$ | 20 | 1.0 | CeO$_2$ | 30 | " |
| 4 | ZrO$_2$ | 60 | 1.5 | — | | " |
| 5 | Al$_2$O$_3$ | 80 | 0.8 | — | | Ceramic honeycomb |

TEST EXAMPLE

The catalysts obtained in Examples 1 to 13 and Comparative Examples 1 to 4 were subjected to the following evaluation tests using a 4-cylinder diesel engine with a displacement of 2300 cc.

Initial test

At an engine revolution speed of 2,500 rpm and a torque of 4.0 kg-m, capturing of fine particles was carried out for 2 hours. Then every 5 minutes the torque was increased by 0.5 kg-m. Variations in the pressure drop of the catalyst were recorded continuously. The temperature (Te) at which the pressure rise owing to the accumulation of the fine particles becomes equilibrated with the pressure fall owing to the burning of the fine particles to maintain is equivalent, and the temperature (Ti) at which the pressure drop abruptly decreases as a result of ignition and burning were determined.

The conversion of $SO_2$ to $SO_3$ was determined at an exhaust gas temperature of 400° C. The conversion (%) of $SO_2$ was calculated in accordance with the following equation after the concentrations of $SO_2$ at the inlet gas and the outlet gas were analyzed by a on-dispersion type infrared analyzer (the NDIR method).

$$SO_2 \text{ conversion } (\%) = \frac{\left[\begin{array}{c}SO_2 \text{ concentration} \\ \text{(ppm) at the inlet}\end{array}\right] - \left[\begin{array}{c}SO_2 \text{ concentration} \\ \text{(ppm) at the outlet}\end{array}\right]}{SO_2 \text{ concentration (ppm) at the inlet}}$$

300 Hour Durability Test

The catalyst durability test was carried out at an engine revolution speed of 2,500 ppm and a catalyst inlet temperature of 600° C., and the activity of the catalyst after 300 hours was evaluated by the same method as in the evaluation of the initial activity, and the degradation of the activity was measured.

The results are shown in Table 2.

TABLE 2

|  | Initial stage | | | After 300 hours | | |
|---|---|---|---|---|---|---|
|  | Te (°C.) | Ti (°C.) | $SO_2$ conv. (%) at 400° C. | Te (°C.) | Ti (°C.) | $SO_2$ conv. (%) at 400° C. |
| Example | | | | | | |
| 1 | 395 | 412 | 3.1 | 401 | 427 | 3.3 |
| 2 | 387 | 401 | 1.8 | 387 | 399 | 2.0 |
| 3 | 386 | 401 | 2.5 | 386 | 404 | 2.6 |
| 4 | 379 | 397 | 2.0 | 384 | 397 | 2.6 |
| 5 | 389 | 406 | 3.9 | 391 | 423 | 3.7 |
| 6 | 401 | 423 | 3.0 | 402 | 426 | 2.7 |
| 7 | 392 | 419 | 1.9 | 392 | 416 | 2.7 |
| 8 | 378 | 389 | 2.9 | 381 | 388 | 3.0 |
| 9 | 398 | 412 | 0.8 | 401 | 421 | 0.5 |
| 10 | 380 | 404 | 0.5 | 394 | 412 | 0.7 |
| 11 | 397 | 416 | 1.2 | 389 | 409 | 0.9 |
| 12 | 401 | 406 | 2.1 | 392 | 399 | 1.9 |
| 13 | 361 | 384 | 4.3 | 366 | 389 | 4.0 |
| Comparative Example | | | | | | |
| 1 | 421 | 452 | 5.1 | 557 | 579 | 4.9 |
| 2 | 410 | 446 | 3.6 | 487 | 502 | 3.5 |
| 3 | 396 | 411 | 4.1 | 501 | 524 | 4.9 |
| 4 | 401 | 409 | 1.2 | 561 | 573 | 0.9 |

The catalysts obtained in Examples 14 and 15 and Comparative Example 5 were subjected to the following evaluation tests using a commercial direct-injection, turbocharged diesel engine (4 cylinder, 2800 cc).

Initial test

The amount of a particulate material (part. for short) in the exhaust gas at the inlet and outlet of the catalyst at an engine revolution speed of 2000 rpm, a torque of 8 kg-m and a catalyst inlet temperature of 300° C. was measured by an ordinary dilution tunnel method, and the ratio (%) of purification of the particulate material was calculated. Furthermore, $SO_2$ and gaseous hydrocarbons (HC) in the exhaust gas at the inlet and outlet of the catalyst were analyzed, and the conversion (conv., %) of these substances were also calculated.

300 Hour Durability Test

The catalyst durability test was carried out at an engine revolution speed of 2,500 and a catalyst inlet temperature of 600° C., and the activity of the catalyst after 300 hours was evaluated by the same method as in the evaluation of the initial activity, and the degradation of the activity was measured.

The results are shown in Table 3.

TABLE 3

|  | Initial | | | | | After 300 hours | | | | |
|---|---|---|---|---|---|---|---|---|---|---|
|  | Amount of part. in the exhaust gas | | Purification ratio of part. (%) | HC conv. (%) | $SO_2$ conv. (%) | Amount of part. in the exhaust gas | | Purification ratio of part. (%) | HC conv. (%) | $SO_2$ conv. (%) |
|  | Inlet (mg/m³) | Outlet (mg/m³) | | | | Inlet (mg/m³) | Outlet (mg/m³) | | | |
| Example 14 | 60.9 | 34.2 | 43.8 | 78 | 0.8 | 67.2 | 39.3 | 41.5 | 76 | 0.7 |
| Example 15 | 65.2 | 37.5 | 42.5 | 85 | 1.5 | 68.6 | 34.1 | 50.3 | 87 | 1.1 |
| Comparative Example 5 | 59.2 | 43.9 | 25.8 | 81 | 3.1 | 66.6 | 59.5 | 10.6 | 31 | 2.3 |

It is clearly seen from the results given in Tables 2 and 3 that the catalyst of this invention comprising palladium and an oxide of at least one element selected from the group consisting of praseodymium, neodymium and samarium not only has a high purification ability, but also undergoes little degradation under rigorous conditons, for example in a high-temperature oxidizing atmosphere, and is useful as a durable catalyst for purification of diesel engine exhaust gases.

We claim:

1. A process for purifying the exhaust gas of a diesel engine comprising contacting the exhaust gas of a diesel engine with a diesel engine exhaust gas purification catalyst for purifying fine particles comprising a refractory three-dimensional structure having deposited thereon (a) a refractory inorganic oxide, (b) palladium and (c) an oxide of at least one element selected from the group consisting of praseodymium, neodymium and samarium.

2. The process of claim 1, wherein said catalyst further comprises a cerium oxide and/or a lanthanum oxide.

3. The process of claim 1, wherein said refractory inorganic oxide is at least one compound selected from the group consisting of active alumina, silica, titania, zirconia, silica-alumina, alumina-zirconia, alumina-titania, silica-titania, silica-zirconia, titania-zirconia and zeolite.

4. The process of claim 3, wherein said refractory inorganic oxide is zirconia.

5. The process of claim 1, wherein said refractory three-dimensional structure is a ceramic foam, an open flow-type ceramic honeycomb structure, a wall flow-type honeycomb monolithic structure, an open flow-type metal honeycomb structure, a metal foam or a metal mesh.

6. The process of claim 5, wherein said refractory three-dimensional structure is an open flow-type ceramic honeycomb structure or an open flow-type metal honeycomb structure.

7. The process of claim 1, wherein said refractory inorganic oxide and said palladium are deposited in amounts of 3 to 300 g and 0.1 to 20 g, respectively, per liter of the refractory three-dimensional structure.

8. The process of claim 1, wherein said oxide of praseodymium, neodymium and/or samarium is deposited in a total amount of 1 to 50 g per liter of the refractory three-dimensional structure.

* * * * *